Patented Feb. 22, 1949

2,462,658

UNITED STATES PATENT OFFICE 2,462,658

COMPOSITION COMPRISING AN AMIDE-ALDEHYDE RESIN AND AS A PLASTICIZER A POLYESTER OF A DIHYDRIC ETHER OF PROPYLENE GLYCOL AND A DICARBOXYLIC ACID

Eugene W. Moffett, Milwaukee, Wis., assignor to Pittsburgh Plate Glass Company, Allegheny County, Pa., a corporation of Pennsylvania No Drawing. Application March 7, 1946, Serial No. 652,805

17 Claims. (Cl. 260—31.4)

1

The present invention relates to the plasticization of synthetic resins and it has particular relation to the plasticization of resins comprising condensation products of aldehydes such as formaldehyde and amides of weak organic acids such as carbonic acid and cyanuric acid. Amides appropriate for such condensation with formaldehyde comprises urea and melamine.

One object of the invention is to provide a plasticizing agent for resins of the foregoing type which is highly compatible with the resins, soluble in the conventional solvents employed for such resins, effectively plasticizes the resins into which they are introduced, and is resistant to heat and other agencies.

A second object is to provide the plasticizer for amine-aldehyde resins such as urea formaldehyde or melamine formaldehyde resins which provides a plasticized body highly resistant to permeation by greases.

A third object is to provide a plasticizer for urea formaldehyde or melamine formaldehyde resins which is non-volatile.

A fourth object is to provide a urea formaldehyde or melamine formaldehyde resin composition adapted for coating purposes which is of superior gloss to materials plasticized in conventional manner.

These and other objects of the invention will be apparent from consideration of the following specification and the appended claims.

The use of urea resins as coating compositions has heretofore been proposed. Such resins possess many advantages such as, for example, high heat resistance, excellent gloss, durability, etc., but heretofore use has been greatly restricted because the resins when fully cured are very brittle and have poor adhesion to most surfaces. In order to improve the properties of the resins in these respects, it has been proposed to incorporate therein various plasticizing agents. A few such agents comprise n-p-toluene sulfonyl ethanolamines disclosed in United States Patent No. 2,201,028, blown oil alkyds disclosed in Patent No. 2,112, 556, and maleic and fumaric acid esters of polyhydroxy alcohols disclosed in Patent No. 2,166,542. While these combinations have been admissible in certain instances, the finishes obtained therefrom were lacking in many respects. For example, flexibility, alkali resistance, color stability upon ageing, and grease resistance were unsatisfactory. Furthermore, in the industry, notably in the coating of refrigerators and other articles which the films after application were to be baked at temperatures of 400° F. or thereabouts, discoloration was likely to occur. Furthermore, the finishes were unsatisfactory for such applications as upon stoves where stability to prolong heat was a requisite. Certain of the materials, notably the maleic and fumaric acid esters of polyhydroxy alcohols were also water soluble which precluded the use of the compounds in many applications.

There has also been considerable experimentation with esters of glycols and dibasic acids which possibly might be suggested as plasticizers of urea resins. Many such compounds have previously been made and studied or at least are theoretically possible. But all of these heretofore tested have been objectionable because of incompatibility in the resins or insolubility in the solvents of the resins or for reasons of instability of products containing them. As examples of alkyds which have been so tested and have proven to be unsatisfactory may be mentioned ethylene and diethylene glycol phthalates which were found to be insoluble in toluene and the like solvents of urea-formaldehyde resins and incompatible with the resins themselves. The same remarks apply to esters of the foregoing glycols and other dibasic acids of short chain length such as maleic acid, fumaric acid, succinic acid and etc.

Probably the most nearly commercially acceptable plasticizers of urea-formaldehyde resins and the like heretofore tried or suggested, have comprised certain oil modified alkyd resins, which for certain purposes have proven fairly satisfactory. However, very large proportions of these plasticizing alkyd compounds are required to obtain adequate plasticity. Indeed, in a flexible adherent product, the modified alkyd resin comprises the major component of the mixture and the urea-formaldehyde component is merely a modifier thereof. For example, for practical purposes the urea resin cannot much exceed 40 parts per 60 parts of the alkyd component. Obviously, the compositions containing such large amounts of alkyd resin are subject to most of the objections characterizing oil modified alkyd resins.

The present invention is based upon the discovery that polyesters of (A) glycols of relatively long chain length, notably the ether type glycols, and (B) dicarboxylic acids of medium to long chain length are highly effective as plasticizers of urea-formaldehyde or melamine-formaldehyde resins and are particularly applicable for such uses as the plasticization of these resins in coating compositions.

For example, it has been found that dipropylene glycol phthalate is both soluble in aromatic solvents and compatible with urea-formaldehyde resins and therefore is quite applicable for use in coating compositions embodying a system of such resin and solvent. Propylene glycol phthalate, on the other hand, although it is soluble in toluene is incompatible with the resins.

Other effective plasticizers for urea-formaldehyde or melamine-formaldehyde resins or mixtures of the two, include dipropylene glycol esters of 2,6-endomethylene-delta-4, tetrahydrophthalic acid, 4-methyl-delta-4-tetrahydrophthalic acid, 4-delta-4-tetrahydrophthalic acid. Similarly the dipropylene glycol polyesters of long chain dibasic acids such as azelaic, sebacic, adipic acid, pimelic acid, subaric acid and the like containing up to 12 or even 18 to 19 carbon atoms can be employed effectively in plasticizing urea-formaldehyde resins, especially in coating compositions. The use in soluble urea-formaldehyde resins of polyesters of these same acids and molar or near molar ratios of other ether type glycols containing long chains between the hydroxyls is contemplated. Examples of such glycols would be di and tripropylene glycols.

Some of these plasticizers are especially desirable for certain particular applications. For example, 1,2 dipropylene glycol phthalate polyester in urea-formaldehyde resins has been found to have exceptionally high resistance to greases and oils. Therefore, its use in compositions for coating papers employed in wrapping greasy food products and for other applications where exposure to greases is likely to occur is suggested. However, this particular polyester is not quite so effective a plasticizer for the resin in which it is employed as certain other compounds to be described. Of course, use of this grease resistant plasticizer in combination in suitable proportion, e. g. 1:2, 1:3 or 1:4 ratio with plasticizers to be described having a higher plasticizing action is contemplated. Appropriate plasticizers for addition to the dipropylene glycol phthalate are described in Examples 3 and 5.

The preferred products of this invention are esters containing two or more dibasic acids. Combinations of the polyesters of cyclic dibasic acids such as phthalic acid, ortho-, meta- or para- or di-, tetra-, or hexa-hydro derivatives thereof or 3,6 endomethylene-delta-4 tetrahydrophthalic acid with long chain dibasic acids such as adipic, pimelic, azelaic, etc., containing 6 to 19 carbon atoms per molecule are preferred. The term acid also contemplates the anhydride. The two acids are commonly used in a molar ratio of 1:1 but it is not intended to limit our compositions to this ratio. The esters of the unmixed acids are applicable for many purposes and it would appear that all mixtures between the extremes are operable. Ultimately, as one component is reduced in quantity, its effect in the ester plasticizer becomes negligible. Suggested ratios in mixed polyesters would be from 1:.05 to .05:1 for specific applications.

These polyesters are long chain molecules and because of the absence of reactive unsaturated or at least highly unstable groups therein, such as those present in drying or semidrying oil acids, they have superior heat resistance and color stability. However, for purposes of shortening reaction time required to reach desired viscosity, it has been found advisable, but not essential, that a part of the dipropylene glycol be replaced by a polyhydroxy alcohol of higher functionality such as glycerine or pentaerythritol, sorbitol, arabitol, etc. In the preferred formulation the molar ratio of glycol to glycerine or other polyhydroxy compound is about 6:1 but this may be as low as 2.5:1 and may be as high as 12: to 1 or even higher. The addition of a polyalcohol such as glycerine permits the formation of some cross linkages between the long chain molecules which impart higher viscosity to the solutions of such products.

At the preferred ratio, i. e. 6-1, the resins may be heated for long periods of time at high temperatures with little or no change in properties. However, if it is desirable to impart some degree of heat-convertibility to the resin, this can be accomplished by using more glycerine, such as a 3:1 molar ratio of glycol to glycerine. If properly prepared, using about 10-15% excess hydroxyl equivalents in the starting composition, resins can be prepared having low acid numbers, high bodies and good plasticizing properties and which have been found to convert to more viscous forms when baked at 400° F.

The following examples are illustrative of the type of resins which have been found to be effective as plasticizers for urea resins when used as protective or decorative coatings.

Example 1

One hundred forty-eight grams of phthalic anhydride and 157 g. of dipropylene glycol were heated in three hours to 232° C. and the batch held at this temperature for eight hours. An inert gas was passed through the batch slowly to carry off the water formed and during the last hour its flow was increased to remove any excess free glycol. This resin was not thinned but was found to be soluble in mono methylether of ethyleneglycol, n-butanol, and toluene. It was compatible with urea formaldehyde resin and gave a hard, flexible, glossy, clear film when mixed with it at 1:1 ratio (on the basis of solids content) and baked 30 minutes at 350° F. This resin does not impart a high degree of flexibility to the finish but has the best oil and grease resistance.

Example 2

Eighty-two parts by weight of 2,6-endomethylene delta-4 tetrahydrophthalic anhydride, seventy-four parts by weight of phthalic anhydride and one hundred seventy parts by weight of dipropylene glycol were heated to 210° in one hour, gradually raised to 230° in eight hours, and held at this temperature for five hours. Inert gas was used to carry out the water vapor. Samples of the resin were thinned to 50% concentration in toluene, mono ethylether of ethylene glycol and its acetate. All had viscosities under A on the Gardner-Holdt scale. The resin was combined with a soluble urea-formaldehyde resin at three different ratios, namely 40-60, 50-50 and 60-40 urea to plasticizer. These compositions formed hard, flexible, clear films on baking and were heat resistant. Any of the above named solvents may be employed in making up a coating composition.

Example 3

Two hundred ninety-six parts by weight of phthalic anhydride, 404 parts by weight of sebacic acid, and 617 parts by weight of dipropylene glycol were mixed with 200 parts by weight of the solvent which contains chiefly aromatic hydrocarbons and has a kauri butanol value of 90-95. The batch was heated slowly to 150° C.

at which temperature refluxing started and the water evolved was separated in conventional equipment. The temperature rose slowly to about 180° C. and was held there for a total time, from the start, of sixteen hours. Solvent was then allowed to distill from the reaction mixture until the temperature climbed to 232° C. After five hours the resin was thinned to 80% solids in aromatic hydrocarbon solvent. It had an acid number of 27.4, and a body of O on the Gardner-Holdt scale. The resin was a very effective plasticizer for urea-formaldehyde resins, especially those soluble in aromatic hydrocarbon, monoalkane ether of ethylene glycol, cyclohexanone, etc.

Example 4

The sebacic acid used in Example 3 was replaced with 292 parts by weight of adipic acid and the batch subjected to the same heating schedule. The product had a body of Q on the Gardner-Holdt scale and acid number of 26.7. The films prepared therefrom with urea-formaldehyde resin were not as flexible as those obtained by use of the product of Example 3, but were better than previously used materials.

Example 5

Two hundred ninety-six parts by weight of phthalic anhydride, 376 parts by weight of azelaic acid, 496 parts by weight of dipropylene glycol, 55 parts by weight of glycerine and 225 cc. of aromatic hydrocarbon solvent were heated according to the schedule of Example 3. The product was thinned to 80% solids and the solution has an acid number of 14.5 and a body on the Gardner-Holdt scale of Z–1. This an example of the preferred ratio between the glycol and glycerine.

Example 6

Two hundred ninety-six parts by weight of phthalic anhydride, 376 parts by weight of azelaic acid, 410 parts by weight of dipropylene glycol, 94 parts by weight of glycerine and 225 parts by weight of aromatic hydrocarbon solvent were heated to 170° C. with agitation in 2.5 hours. The temperature of the batch was allowed to climb slowly to 220 degrees in the course of five hours by gradual removal of solvent. The batch was then cooled somewhat and thinned to 67% solids in the same solvent. The product had an acid number of 21.2 and a body approaching Y on the Gardner-Holdt scale. This resin, when combined with urea-formaldehyde resins, was an efficient plasticizer and would heat convert to some extent. This latter property apparently did not affect the plasticizing value of the resin.

Example 7

Two hundred sixty pounds of phthalic anhydride, 330 lbs. of azelaic acid, 444 lbs. of dipropylene glycol, and 50 lbs. of glycerine were mixed with 8 gallons of aromatic hydrocarbon solvent. Heat was applied and agitation started as soon as the materials melted. The batch was raised to 360° F. in about four hours, held at this temperature for two hours and then raised slowly in about three hours to 430° F. The batch was held at this temperature until a sample of it thinned in solvent had a J body at 65% solids. The batch was cooled to 360° F. and thinned to this concentration in the same solvent. The final product had a K body and an acid number of 14.

After esterification of the dipropylene glycol by the dibasic acids (or anhydrides) in the examples or similar procedures, the product preferably is thinned to promote ease of handling. Aromatic solvents such as toluene, xylene or other solvents containing a predominant proportion of aromatic compounds is preferred. Alternately they may be thinned with esters such as are used in lacquers (e. g. amyl acetate) or with glycol ethers (mono methyl, mono ethyl, mono butyl, etc.)

Products from the examples were combined with soluble urea-formaldehyde resin and tested in clear and pigmented finishes. They imparted excellent flexibility, gloss and flow properties to the urea finishes. White enamels for finishing stoves, refrigerators, etc., were prepared using the plasticizing resin and urea resins in 50–50 and 40–60 ratios. These finishes had excellent heat ageing properties, good color permanence and excellent alkali and water resistance, as well as the above mentioned properties.

The longer chain acids are more effective than the shorter ones and adipic acid appears to be approaching the lower limit. The use of mixed esters of three or more acids in one resin is contemplated. In general the use of mixed esters of the types described appears to give products imparting better flexibility to urea formaldehyde resins.

The previous description has applied to urea resins. At present commercial products are available which contain both melamine and urea. These plasticizers are also effective with such resins and it is not intended to limit the invention to urea-formaldehyde resins only but to include these or other resins derived from urea and melamine.

A preferred method of preparing a coating composition is to dissolve an urea-formaldehyde resin of a grade soluble in such solvents as toluol, cyclohexanone, monomethyl or monoethyl or monobutyl ether of ethylene glycol, diacetone or alcohol, in one of the solvents for the resin. An appropriate solvent would be toluol and the ratio would be such as to produce a solution of desired viscosity. The ratio of resin in the solvent may be within a range of 10 to 60 per cent or thereabouts.

It will also be apparent that urea and formaldehyde can be reacted in the plasticizer or a solution of the plasticizer to form plasticized resin in situ. In such process water present mutually or formed by reaction may be removed by evaporation of a liquid such as xylene or by sweeping with an inert gas such as carbon dioxide. Of course, pigments such as titanium dioxide or other coloring or hiding agents may be and usually are included in the coating compositions.

The solutions are applied by spraying, brushing or other conventional methods of coating. In order to harden the films, they may be baked in ovens at temperatures of 300 or 400° F. or even above without deleterious effects.

The plasticizers because of solubility in solvents for urea-formaldehyde resins or melamine formaldehyde resins or blends of the two, are especially useful in coating compositions, but they can also be employed in clear or filled casting compositions, and in molding powders containing large amounts of fillers such as wood flour. The plasticizers may be added to solutions of the resins before hardening or may be added to molding powders after solidification.

Needless to say the plasticizers are of but slight volatility at any ordinary temperature and bodies containing them retain their plasticity exceptionally well.

The use of the polyesters herein described in urea-formaldehyde resins has been emphasized since this resin is made in unusually large amounts. However, the related formaldehyde-melamine resin can also be plasticized in the same way. This also applies to mixtures containing 10 to 90 per cent of melamine resin, the rest of the mixture being urea resin.

Soluble urea-formaldehyde resins suitable for use in the practice of the invention usually contain an alcohol component as a modifier. They may be obtained by condensing urea and formaldehyde in the presence of an alcohol such as butyl alcohol. The use of other alcohols capable of rendering the products soluble is contemplated.

Reference is made to my copending applications filed of even date herewith and respectively entitled:

"Coating composition comprising an amide aldehyde resin and a polyester of an alpha-alkyl ether of glycerol and a dicarboxylic acid as plasticizer," Serial No. 652,807 now Patent No. 2,460,187; "A coating composition comprising an amide aldehyde resin and a polyester of 2-ethyl hexanediol-1,3 and a dicarboxylic acid as plasticizer," Serial No. 652,806 now Patent No. 2,460,186.

The forms of the invention herein given are only examples. It will be apparent to those skilled in the art that numerous modifications may be made without departure from the spirit of the invention or the scope of the appended claims.

I claim:

1. A plasticized resin composition comprising a formaldehyde amine condensation product, the amine including a single carbon atom having at least two basic nitrogen atoms joined directly thereto, said resin composition containing a polyester of (a) a dihydroxy alcohol of the formula

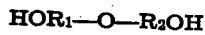

in which $R_1$ and $R_2$ are hydrocarbon radicals containing three carbon atoms and (b) a dicarboxylic acid containing six to nineteen carbon atoms.

2. An alcohol modified urea-formaldehyde resin containing as a compatible plasticizer a polyester of dipropylene glycol and an open chain dicarboxylic acid containing six to nineteen carbon atoms in the chain.

3. An alcohol modified urea-formaldehyde resin containing as a compatible plasticizer a polyester of dipropylene glycol and an open chain dicarboxylic acid containing six to ten carbon atoms in the chain.

4. A coating composition containing in solution in an organic solvent for urea-formaldehyde resins, an alcohol modified urea-formaldehyde resin in a ratio of ten to sixty per cent and as a compatible plasticizer soluble in the solvent, a polyester of dipropylene glycol and a dicarboxylic acid containing six to nineteen carbon atoms.

5. As an improved coating composition an alcohol modified urea formaldehyde resin dissolved in an organic solvent and containing in solution therewith as a compatible plasticizer therefore an ester of dipropylene glycol and a dicarboxylic acid containing six to nineteen carbon atoms in an open chain.

6. As an improved coating composition an alcohol modified urea-formaldehyde resin dissolved in an organic solvent and containing in solution therewith as a compatible plasticizer a polyester of dipropylene glycol and phthalic acid.

7. As an improved coating composition an alcohol modified urea-formaldehyde resin dissolved in an organic solvent and containing in solution therewith as a compatible plasticizer a polyester of dipropylene glycol and 3,6-endomethylene-delta-4, tetrahydrophthalic acid.

8. As an improved coating composition urea-formaldehyde resin of soluble grade dissolved in an organic solvent therefore and containing in solution therewith as a compatible plasticizer a mixed polyester of dipropylene glycol, phthalic acid and an open chain dicarboxylic acid containing six to nineteen carbon atoms.

9. A coating composition as defined in claim 8 in which the dicarboxylic acid component of the ester contains eight to ten carbon atoms.

10. A coating composition as defined in claim 4 in which the dicarboxylic acid contains eight to ten carbon atoms.

11. A coating composition as defined in claim 17 in which the resin is dissolved in an aromatic hydrocarbon.

12. As an improved coating composition a mixture of an alcohol modified urea-formaldehyde resin of a grade soluble in non-aqueous organic solvents and a polyester of (A) a dihydric ether of 2 to 3 molecules of propylene glycol (B) a mixture of (1) an open chain dicarboxylic acid containing 6 to 19 carbon atoms in the chain (2) a cyclic dicarboxylic acid which contains 6 to 9 carbon atoms at least 6 of its carbon atoms being in a six-sided ring, all dissolved in a solvent of said resin.

13. A composition as defined in claim 1 in which the polyester comprises 40 to 60% of the resin-ester mixture.

14. A composition as defined in claim 17 in which the polyester comprises 40 to 60% of the resin-plasticizer mixture.

15. A coating composition as defined in claim 17 in which the urea resin is modified by an aliphatic monohydric alcohol and comprises 40 to 60% of the mixture.

16. A coating composition as defined in claim 17 in which the resin is modified by butyl alcohol and the resin constitutes 40 to 60% of the mixture.

17. A urea-formaldehyde resin which is plasticized with a polyester of (a) a dihydric ether of 2 to 3 molecules of propylene glycol and (b) a dicarboxylic acid containing 6 to 19 carbon atoms.

EUGENE W. MOFFETT.

REFERENCES CITED

The following references are of record in the file of this patent:

UNITED STATES PATENTS

| Number | Name | Date |
| --- | --- | --- |
| 2,341,846 | Meincke | Feb. 15, 1944 |